(12) United States Patent
Abbott et al.

(10) Patent No.: US 6,176,395 B1
(45) Date of Patent: Jan. 23, 2001

(54) DUAL DISPENSE CONTAINER

(75) Inventors: Douglas A. Abbott, Easton, PA (US); Justin E. McDonough, Kenvil, NJ (US)

(73) Assignee: Pechiney Plastic Packaging, Inc., Chicago, IL (US)

( * ) Notice: Under 35 U.S.C. 154(b), the term of this patent shall be extended for 0 days.

(21) Appl. No.: 09/295,824

(22) Filed: Apr. 21, 1999

(51) Int. Cl.⁷ .............................. B65D 35/22; B67B 5/00; B67D 5/60
(52) U.S. Cl. .................... 222/94; 222/153.09; 222/145.1; 222/145.3
(58) Field of Search ................................. 222/94, 153.09, 222/153.01, 145.1, 145.3

(56) References Cited

U.S. PATENT DOCUMENTS

| | | |
|---|---|---|
| 1,535,529 | 4/1925 | Hopkins . |
| 1,555,676 | 9/1925 | Leland . |
| 1,639,699 | 8/1927 | Hopkins . |
| 1,698,404 | 1/1929 | Hopkins . |
| 1,699,532 | 1/1929 | Hopkins . |
| 2,218,092 | 10/1940 | Nitardy . |
| 2,918,199 | 12/1959 | Marraffino . |
| 2,939,610 | 6/1960 | Castelli . |
| 3,007,614 | 11/1961 | Morrow . |
| 3,042,263 | 7/1962 | Gallo, Sr. . |
| 3,135,428 | 6/1964 | Gallo, Sr. . |
| 3,168,968 | 2/1965 | Krakowsky . |
| 3,175,731 | 3/1965 | Ellman . |
| 3,200,995 | 8/1965 | Gangwisch . |
| 3,206,074 | 9/1965 | Hoffmann . |
| 3,217,931 | 11/1965 | Farrar et al. . |
| 3,335,912 | 8/1967 | Reeves, Jr. . |
| 3,506,157 | 4/1970 | Dukess . |
| 3,724,722 | 4/1973 | Ballo . |
| 3,876,111 | 4/1975 | Swain . |
| 3,936,334 | 2/1976 | Kushida et al. . |
| 4,148,416 | 4/1979 | Gunn-Smith . |
| 4,211,341 | 7/1980 | Weyn . |
| 4,528,180 | 7/1985 | Schaeffer . |
| 4,585,149 | 4/1986 | Zulauf . |
| 4,687,663 | 8/1987 | Schaeffer . |
| 4,964,539 | 10/1990 | Mueller . |
| 5,076,470 | 12/1991 | Hatakeyama et al. . |
| 5,102,013 | 4/1992 | Schneider et al. . |
| 5,318,192 | 6/1994 | Rebeyrolle et al. . |
| 5,318,203 | 6/1994 | Iaia . |
| 5,324,505 | 6/1994 | Kornettka et al. . |
| 5,328,056 | 7/1994 | Schneider et al. . |
| 5,553,747 | 9/1996 | Raba et al. . |
| 5,590,818 | 1/1997 | Raba et al. . |
| 5,823,387 | 10/1998 | Manadanas et al. . |
| 5,941,420 | 8/1999 | Connan . |
| B1 4,687,663 | 8/1987 | Schaeffer . |

FOREIGN PATENT DOCUMENTS

| | | |
|---|---|---|
| 577-523 | 9/1924 | (FR) . |
| 956377 | 4/1964 | (GB) . |
| 1385924 | 3/1975 | (GB) . |
| 60-188150 | 9/1985 | (JP) . |
| WO 97/14624 | 4/1997 | (WO) . |

*Primary Examiner*—Kevin Shaver
*Assistant Examiner*—David Deal
(74) *Attorney, Agent, or Firm*—Ohlandt, Greeley, Ruggiero & Perle, LLP (57) ABSTRACT

A dual dispense container is comprised of an inner container and an outer container, the outer container neck base having a groove, a latch and an undersurface, and the inner container neck having a bead engaged in the groove, and ribs below the bead which abut the undersurface and cause the latch of the outer container to lock the bead in the groove and thereby lock the inner container within the outer container.

A method of locking an inner container within an outer container of a dual dispense container comprises abutting ribs of the inner container against the undersurface of a latch at the base of the neck of the outer container, to latch and lock a bead of the inner container neck in a groove in the base of the outer container neck.

27 Claims, 4 Drawing Sheets

DUAL DISPENSE CONTAINER

BACKGROUND OF THE INVENTION

1. Field of the Invention

This invention relates to multiple product dispensing containers, such as dual dispense containers, comprised of an outer container and an inner container, wherein products contained in the respective inner and outer containers are simultaneously dispensed from the dual dispense container orifice. More particularly, this invention is directed to the securement of inner containers to outer containers of dual dispense containers.

Dual dispense containers, including collapsible dual dispense tubes, are well known. However, there has been a need for a more effective way to secure the inner and outer containers of dual dispense containers such that, once assembled, they will be locked together and will not move axially or laterally relative to one another. A mere friction fit between the necks of the inner and outer containers, for example, tubes, has not been effective. Providing interengaging portions, e.g., protrusions and indentations at the middle to upper portions of the respective inner and outer tube necks has been somewhat effective in providing less axial movement between the inner and outer tubes, but this approach has not eliminated relative axial or lateral movement, and it has posed problems in manufacturing and assembling the respective tubes. The approach has presented manufacturing problems because once the particular neck is molded with such an upper protrusion, the neck must be moved a relatively long distance along the mold tooling to remove the neck from the tooling. This causes shearing of a portion of the protrusion, and/or distortion or deformation of the tube neck. The distortion or deformation can be permanent or can weaken the neck wall of the tube such that, the inner and outer tube necks, once assembled, may not fit tightly one within the other. This may cause disengagement and/or axial movement of the protrusion relative to its indentation, leakage, and/or an alteration in the product dispense ratios designed for the dual dispense tube.

Providing protrusions at the middle to upper portions of the tube neck has been problematical during assembly of the inner and outer tubes, because it has required pushing the inner tube neck a relatively long distance into the outer tube neck to seat the protrusion in its indentation. The closer the protrusion is to the neck orifice, the further the inner tube must be pushed, the more wear or shearing there is on or of the protrusion, and the greater the chance of the inner tube neck being inserted too far, such that the protrusion is pushed beyond the orifice of the outer tube. While some prior dual dispense tubes have been provided with sloping shoulder engaging surfaces to prevent this from occurring, such engaging surfaces have not been wholly effective in preventing over-insertion from occurring.

Further, providing interengaging portions at the middle to upper portions of the tube necks can present filling problems. It allows the inner tube to cant or become nonconcentric at the bottom open end of the dual dispense tube and thereby cause misalignments with concentric filling heads of filling machines.

2. Description of Related Art

Examples of known dual dispense containers are disclosed in the following patents. U.S. Pat. No. 1,699,532 to Hopkins discloses an inner collapsible tube disposed within an outer collapsible tube. The upper end of the inner tube neck has outwardly extending projecting portions which friction fit within the outer tube neck, and the inner tube shoulder has projections or knots having an edge which engage the downwardly sloping inner surface of the outer tube shoulder at points spatially removed from the base of the outer tube neck. With this construction, the tubes are not locked securely together. There can be relative axial movement between the tubes. For example, the inner tube can be pushed downwardly into the outer tube. Also, during assembly, when the inner tube is pushed into the outer tube, the inner tube neck can be pushed too far such that the inner tube knots can ride up the inclined outer tube shoulder surface and the projecting portions at the upper end of the neck can be pushed beyond the orifice of the outer tube. It has been found that if the dual tube is designed with greater friction between the outer and inner tube necks, the inner tube neck can collapse or be distorted. If the walls of the inner tube neck are thickened to prevent this, the dispense area of the inner tube is reduced and during dispensing, there is an increased pressure drop and less product flow from the inner tube for mixing with product from the outer tube.

U.S. Pat. No. 2,218,092 to Nitardy discloses another collapsible dual dispensing tube wherein the securement of a metal inner tube within a metal outer tube is effected by a mere friction fit between radially outwardly projecting lugs on the inner tube neck and the inner surface of the outer tube neck, and between lower sloping portions of the lugs and the sloping portion of the outer tube under the base of its neck. Again, in this construction, the inner tube neck can move axially within the outer tube neck. For example, the upper tube neck extends beyond the outer tube neck and there is nothing to prevent the inner tube neck from being pushed down into the outer tube neck. Also, the sloping portion of the inner tube neck can ride up on the sloping portion of the outer tube.

U.S. Pat. No. 2,939,610 to Castelli et al discloses a collapsible dual dispensing tube wherein the securement between the inner and outer tubes is effected by a friction fit between opposed portions of the inner tube neck and the outer tube neck. With this construction, although the outer tube neck orifice has a flange which extends radially inwardly over the lip of the inner tube and prevents the inner tube from being pushed further up into the outer tube, the inner tube neck still can move axially down into the outer tube neck. This construction is also undesirable because at the flange of the orifice, there will be an accumulation and premature mixing of inner product and outer product. Also, such mixed product will be pushed into the dual dispense tube neck when the cap is secured into the tube.

U.S. Pat. No. 4,687,663 to Schaeffer discloses a collapsible dual dispense tube whose inner tube neck has opposed outward protrusions which fit in a groove on the inner surface of the outer tube neck. While this construction would prevent axial movement between the tubes, it would not prevent the inner tube neck from being overinserted into the outer tube neck. Also, it would not prevent lateral, rocking or canting movement of the inner tube within the outer tube. This movement could cause filling problems. It could also affect the sizes and shapes of one or both of the respective dispense orifices and of the channels leading to those orifices and could thereby cause the actual product dispense ratio to be different from that designed for the inner and outer tubes.

U.S. Pat. No. 5,328,056 to Schneider et al discloses an improved collapsible dual dispensing tube having an annular fixing rib extending radially inward from the inner surface of the outer tube neck near its orifice, and which is engaged within an annular groove in the outer surface of the inner tube neck. The inner tube also has ribs whose edges abut against the inner surface of sloping shoulders of the outer tube at points spatially removed from the base of the outer tube neck.

Given existing collapsible dual dispense containers as discussed above and as disclosed in the aforementioned patents, it is desirable and it is a primary objective of this invention to provide dual dispense containers, especially collapsible ones, for example, collapsible dual dispense tubes, having improved securement between the inner and outer containers which prevents axial movement and preferably also lateral, canting or rocking movement between the containers.

Another object of this invention is to provide aforementioned desired collapsible dual dispense containers having securement means located at the base of the neck of the outer tube, for securing the inner and outer tubes together.

Another object of this invention is to provide such a desired collapsible dual dispense tube having improved securement means in the form of a bead extending outward from the outer surface of the inner tube neck and which is frictionally engaged within a groove in the inner surface of the outer tube neck, wherein the bead is located at, adjacent or proximate to the base of the neck of the outer container.

Another object of this invention is to provide an aforementioned desired collapsible dual dispense tube whose inner tube has a plurality of locking members disposed about the inner tube neck, whose outer tube neck has an undersurface, and wherein the locking members abut the undersurface and assist in maintaining the bead within the groove.

Yet another object of this invention is to provide an aforementioned collapsible dispense tube whose outer tube has a latch at the base of the outer tube neck below the groove, such that the abutment of the locking means of the inner tube against the undersurface of the outer tube latches and locks the bead of the inner tube in the groove of the outer tube.

Still another object of this invention to provide aforementioned desired dual dispense containers which are easy to manufacture, assemble and fill.

BRIEF SUMMARY OF THE INVENTION

This invention is directed to a dual dispense container, comprising an outer container and an inner container locked within the outer container, each container being comprised of a body wall defining a chamber, and a head comprised of a neck, and a shoulder communicating with the neck and body wall, the neck having a dispense orifice, a base, and a bore communicating with the orifice and the chamber. The neck of the outer container includes securement means at the base of and communicating with the bore of the outer container neck, the base of the neck of the outer container having an undersurface, and the securement means of the outer container including the undersurface. The neck of the inner container is disposed within the neck of the outer container. The inner container has securement means engaged with the securement means of the outer container neck, the securement means of the inner container including locking means disposed about the inner container neck, and which abut the undersurface of the base of the outer tube neck, the securement means of the outer and inner container necks and the locking means of the inner container thereby cooperating to lock the inner container axially within the outer container. The abutment of the locking means against the undersurface of the base of the outer container neck enhances the engagement of the respective securement means of the inner and outer containers and thereby helps lock the inner container axially within the outer container. The base of the outer container neck can include an interstitial portion or wall between the securement means of the outer container neck and the undersurface of the outer container neck, such that the abutment of the locking means against the undersurface locks the interstitial portion or wall between the securement means of the inner container and the locking means of the inner container.

The securement means at the base of the outer container neck can include a groove extending from the bore into the interior surface of the outer container neck, and a latch between the groove and the undersurface. The securement means of the inner container neck can include a bead extending outward from an outer surface of the inner container neck, and fitting within and being frictionally engaged by the groove of the outer container neck.

The inner container locking means which abut a portion of the undersurface of the base of the outer container neck cause the latch of the outer container neck to lock the bead of the inner container neck in the groove of the outer container neck and thereby lock the inner container axially within the outer container. The latch can include an interstitial wall which forms part of the bore of the inner container neck, and the abutment of the locking means against the undersurface of the inner container neck can lock the interstitial wall between the bead of the inner container neck and the locking means of the inner container.

The groove can extend about the entirety of the bore of the outer tube neck, and the bead of the inner tube neck can be interrupted and preferably extends a total of at least 180° about the inner tube neck. The groove can be defined in part by a lower wall portion, and the lower wall portion can form part of the latch. Also, the portion of the undersurface of the base of the outer container neck which is abutted by the locking means can form part of the latch. The latch, and/or the interstitial wall preferably has an axial height which is less than, preferably about one-quarter to one-half of the axial height of the groove. The latch preferably is flexible, and movable radially outward and downward relative to the longitudinal central axis of the outer container neck. The base of the outer container neck can be movable radially outward and downward relative to the longitudinal central axis.

The undersurface of the base of the outer container neck which is abutted by the locking means, for example, the portion of the undersurface which extends under the bead in the groove, preferably lies in a plane which is at an angle equal to or less than 90° relative to the longitudinal central axis of the outer container neck. The locking means can have abutment surfaces for abutting the undersurface and the disposition of the abutment surfaces and of said abutted undersurface can correspond. The locking means can comprise a plurality of upstanding rigid ribs. The ribs are sufficient in number and sufficiently spaced from one another to prevent the inner container from moving laterally within the outer container, and the ribs can communicate with and extend from the inner tube neck and shoulder.

In an alternative embodiment of a dual dispense container of the invention, the securement means at the base of the outer container neck can include a bead extending into the bore of the outer container neck, and an undersurface extending in a direction away from the bore. The securement means of the inner container neck can include a groove extending thereinto, the bead of the outer container neck fitting within and being frictionally engaged by the groove of the inner container neck. The inner container can have locking means which abut a portion of the undersurface thereby locking the bead of the outer container neck in the groove of the inner container neck and locking the inner container axially within the outer container.

The dual dispense tube of the invention can be a collapsible dual dispense tube having an inner tube, an outer tube and a combined orifice comprised of multiple, e.g., three or more sections. The neck of the inner tube can have a rectangular shape defining a rectangular bore and orifice, the neck of the inner tube being diametrically disposed within the cylindrical bore of the outer tube neck and forming a central rectangular section of the orifice of the dual dispense tube. The inner tube neck can have opposed elongated side walls with opposed shorter end walls, each end wall having an arcuate outer surface which fits snugly within and against a portion of the interior surface of the outer tube neck wall. Each side wall of the inner tube neck and the portion of the interior surface of the cylindrical bore of the outer tube neck juxtaposed to the respective side wall together form a channel and orifice shaped as a segment of circle, the respective channels and orifices being disposed to each side of the inner tube neck and communicating with the chamber of the outer tube. The inner tube neck can have locking means disposed thereabout, and which abut a portion of the undersurface of the base of the outer tube neck, thereby causing the latch of the outer tube neck to lock the bead of the inner tube neck within the groove of the outer tube neck, and thereby lock the inner tube axially within the outer tube. Each end wall can include an extended axial edge portion and an extended portion of the bead, and the bead of the end walls preferably extends a total of more than 180° about the interior surface of the cylindrical bore of the outer tube neck.

The invention includes a method of locking an inner dispense tube within an outer dispense tube to form an assembled dual dispense tube. The method comprises forming an inner tube having a head joined to a body, the head having a neck and a shoulder, and the neck having an orifice, a lower portion, a base below the lower portion and adjoining the shoulder, a radially outwardly extending bead which preferably extends a total of at least 180° about the lower portion, and a plurality of locking means disposed about the neck axially spaced a short distance below the bead; forming an outer tube having a head joined to a body, the head having a neck with a bore, an orifice, a base, and a groove extending into the outer tube neck bore at the base and adapted to frictionally engage the bead of the inner tube neck, the base of the outer tube neck having an undersurface a portion of which extends under the groove, and having an open latch between the groove and the undersurface; inserting the inner tube neck into the outer tube neck; and locking the former within the latter by frictionally engaging the bead of the inner tube neck within the groove of the outer tube neck, and abutting the locking means of the inner tube against the undersurface portion of the outer tube neck base, to thereby close the latch on the bead and latch and lock the bead of the inner tube within the groove of the outer tube. The steps of forming the inner and outer tubes preferably are effected by separately axially injection molding the inner tube head and the outer tube head such that the orifice of each tube of the assembled dual dispense tube is closed by a gate. The method can include simultaneously trimming and removing the gates of the inner and outer tubes in one operation to thereby provide that the orifices of the inner and outer tubes are in the same plane. In the method, prior to the inserting step, there can be included the steps of trimming and removing the gate of the outer tube, using the untrimmed gate of the inner tube neck for orienting and facilitating insertion of the inner tube neck into the outer tube neck, and after the locking step, trimming the gate from the inner tube neck.

The invention also includes a method of forming a dual dispense tube having an inner tube neck secured within an outer tube neck, such that the respective orifices of the inner and outer tube necks which comprise the orifice of the dual dispense tube are in the same plane. The method comprises separately axially injection molding the head of the inner tube and the head of the outer tube such that the neck of each head has an integral gate closing its intended orifice; joining a tubular body to the injection molded head of the inner tube and joining a tubular body to the injection molded head of the outer tube; forming a dual dispense tube by inserting the neck of the inner tube within the neck of the outer tube; axially and laterally locking the inner tube neck within the outer tube neck; and, in one operation, simultaneously trimming and removing the gates of the inner and outer tubes of the dual dispense tube to provide that the orifices of the necks of the inner and outer tubes which comprise the orifice of the dual dispense tube are in the same plane.

DETAILED DESCRIPTION OF THE INVENTION

Figure 1:
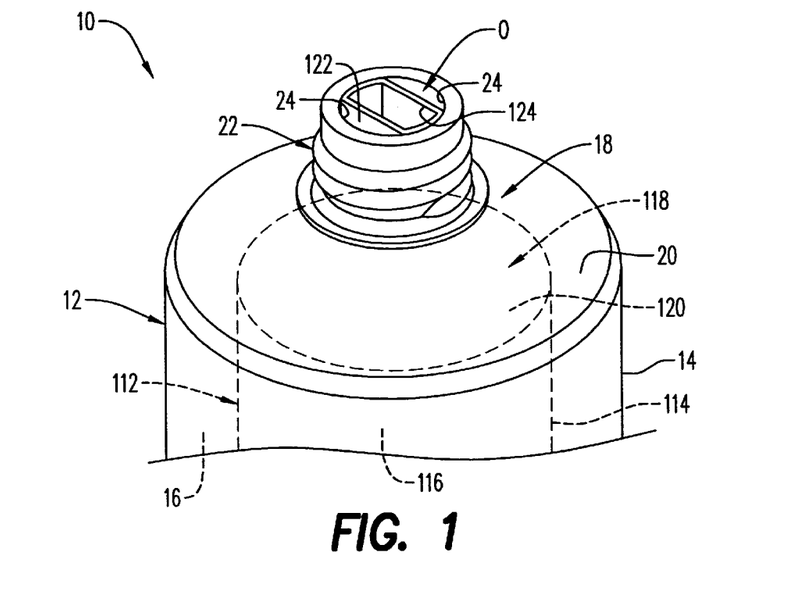
FIG. 1 is a perspective view, with portions broken away, of a preferred collapsible dual dispense container of this invention.
Figure 2:
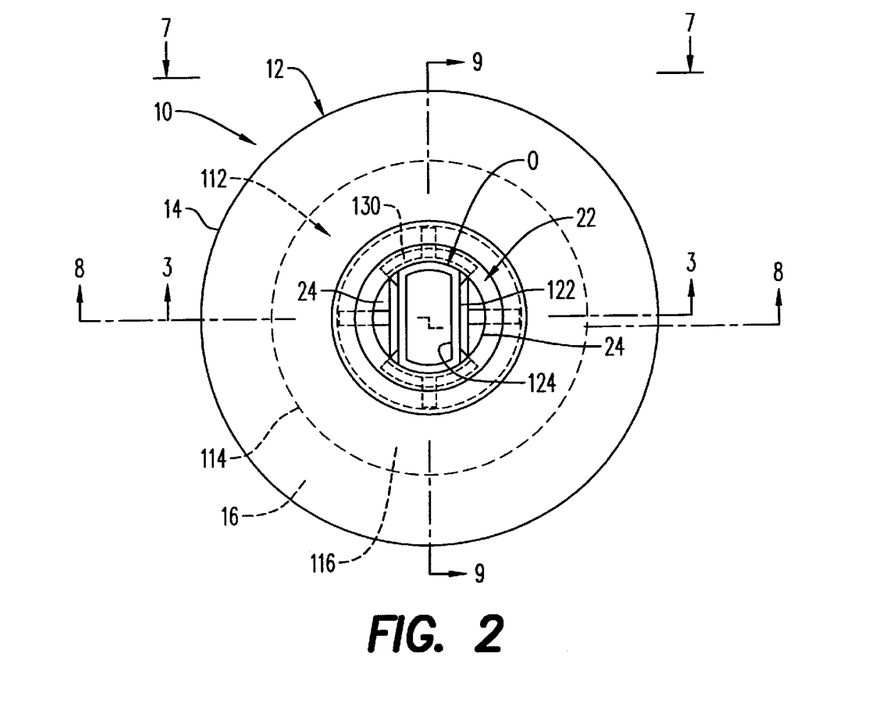
FIG. 2 is a top plan view of the container of FIG. 1.

FIGS. 1 and 2 show a preferred embodiment of a dual dispense container of the invention. More particularly, FIGS. 1 and 2 show a collapsible dual dispense tube, generally designated 10, comprised of an outer tube 12 and an inner tube 112 (dashed line) locked within the outer tube. Each tube 12, 112, is comprised of a tubular body wall 14, 114, respectively defining a portion of a first chamber 16 and of a second chamber 116. Each tube 12, 112 respectively additionally comprises a head, generally designated 18, 118, which in turn is comprised of a neck 22, 122, and a shoulder 20, 120 to which the respective body wall 14, 114 is joined.

Each neck 22, 122 has a dispense orifice 24, 124, the dispense orifices together defining main or combined, annular dual dispense orifice 0 of dual dispense tube 10. Although not shown, each body wall 14, 114 is closed at its bottom by suitable means, as by interfolding and/or sealing the respective body wall to itself. Preferably, the bottom of inner body wall 114 is closed by being interfolded within and/or sealed within the seal of the bottom of outer body wall 14.

Figure 3:
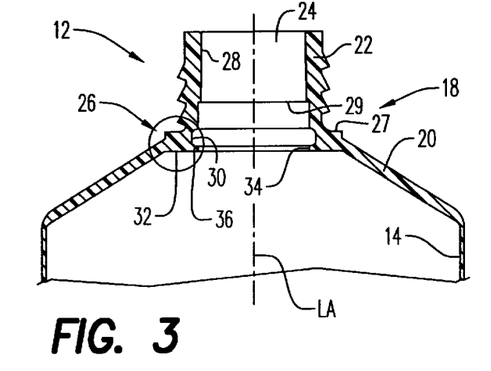
FIG. 3 is a vertical sectional view, with portions broken away, as would be seen through the outer tube, along line 3—3 of FIG. 2.
Figure 4:
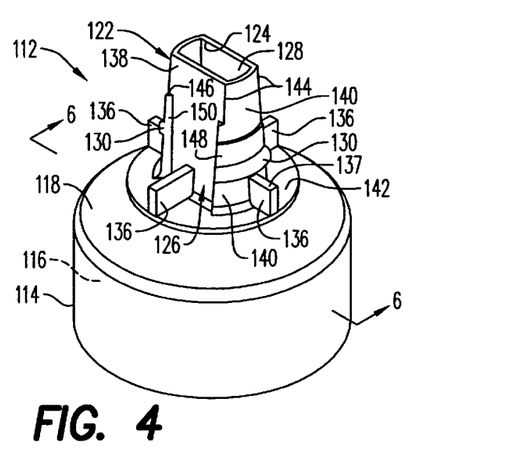
FIG. 4 is a perspective view, with portions broken away, of the inner tube of FIG. 1.
Figure 10:
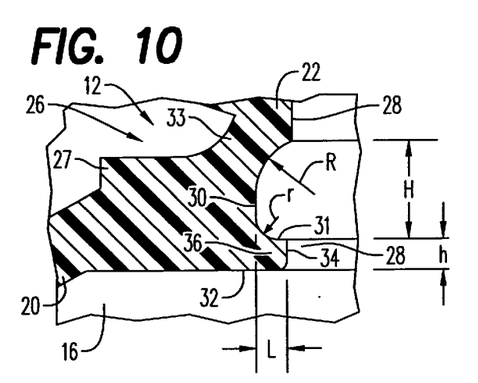
FIG. 10 is an enlarged view of the encircled portion shown in FIG. 3.

FIG. 3 shows that outer tube neck 22 has a longitudinal axis LA, a base 26, and a wall with an interior surface defining a cylindrical bore 28 which communicates with orifice 24 and chamber 16. Bore 28 is slightly tapered from a wider diameter at base 26 to a narrower diameter adjacent orifice 24. Bore 28 has a slight annular radially outward step 29 for assuring a liquid-tight seal between outer and inner tube necks 22, 122. Outer tube neck 22 also includes securement means, here shown as preferably including a groove 30 at, including adjacent or proximate to, base 26 and extending from bore 28 into the interior surface of outer tube neck 22. As also clearly shown in the enlarged view of FIG. 10, the securement means of outer tube neck base 26 preferably also include an undersurface 32, and an interstitial wall 34 between groove 30 and undersurface 32 and which forms part of outer tube neck bore 28. A portion of undersurface 32 communicates with outer tube chamber 16 and extends under a portion of the securement means, here, under groove 30. As shown in FIGS. 3 and 10, the securement means of outer tube neck 22 preferably includes latch 36, which is comprised of a portion of neck base 26 and preferably is formed by a lower wall portion 31 (FIG. 10) of the lower wall which defines groove 30, and by interstitial portion or wall 34 and a portion of base undersurface 32. Base 26 of outer tube neck 22 is the portion of the head at the junction of the vertical portion of neck 22 and the shoulder 20. Base 26 can include outer tube land 27, and portions of the neck which are adjacent or proximate to the base, such as a short extent of the vertical portion of neck 22, usually below the lowermost thread of a threaded neck. A portion neck 22 which is adjacent or proximate to base 26 is below the mid-point of the axial extent of the neck.

FIGS. 4–7 show inner tube 112. More particularly, FIGS. 4–7 show that inner tube neck 122 has a base 126, and a wall with an interior surface defining a bore 128 which communicates with orifice 124 and chamber 116. Inner tube 112 has securement means, here shown as preferably including a bead 130 extending outward from the outer surface of the inner tube neck 122, and being adapted to fit within and be frictionally engaged by groove 30 of outer tube neck 22. FIGS. 4–7 show that inner tube 112 has locking means, here shown as a plurality of upstanding, preferably rigid, ribs 136 disposed about inner tube neck 122 and each having an abutment surface 137 which is adapted to abut a portion of undersurface 32 of outer tube neck base 26, to thereby assist in securing inner tube 112 to outer tube 12 in a manner to be described.

FIGS. 4–7 also show that inner tube neck 122 is rectangular, and it has a rectangular orifice 124 and bore 128, opposed elongated substantially straight side walls 138, and opposed shorter arcuate end walls 140. Inner tube neck 122 is tapered from its narrow upper portion adjacent orifice 124 to its wider base portion adjacent base 126 and land 142. The upper portion of each end wall 140 extends about a shorter arc than the lower portion of each end wall. Each end wall 140 is defined by opposed axial edges 144 which, at the upper portions of end walls 240, directly adjoin with the respective upper portions of side walls 138. Axial edges 144 include circumferentially opposed outwardly projecting steps 146, and circumferentially opposed extended axial edge portions 148 which define the wider, middle-to-lower and base portions of end walls 140. The middle-to-lower and base portions of end walls 140 adjoin each side wall 138 through an arcuate, axially extending side wall surface 150. As will be explained, the wider middle-to-lower and base portions of end walls 140 help provide lateral stability to the securement of inner tube 112 within outer tube 12.

Figure 5:
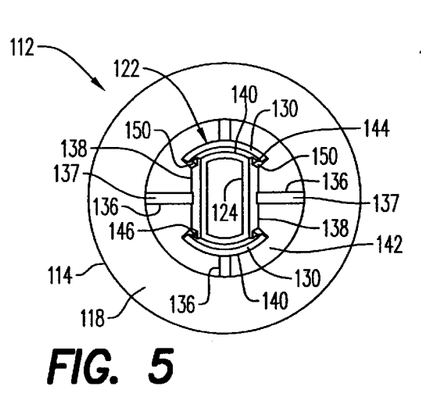
FIG. 5 is a top plan view of the inner tube of FIG. 4.
Figure 6:
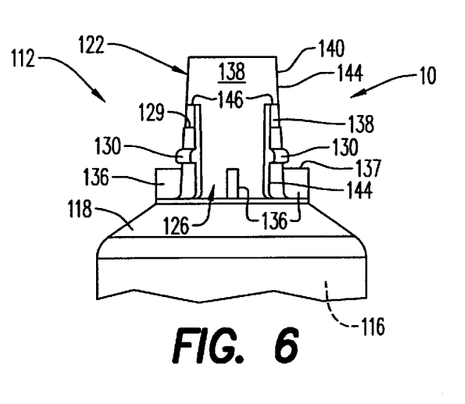
FIG. 6 is a side elevational view, with portions broken away, of the inner tube as would be seen along line 6—6 of FIG. 4.
Figure 7:
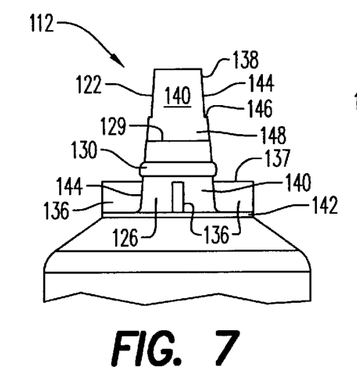
FIG. 7 is a front end elevational view, with portions broken away, of the inner tube, as would be seen along line 7—7 of FIG. 2.

FIG. 5 shows that ribs 136 preferably are spaced equally, preferably 90°, from each other about the circumference of inner tube neck 122, and FIG. 7 shows that the ribs communicate with and extend from inner tube neck 122 and with and from land 142.

Figure 8:
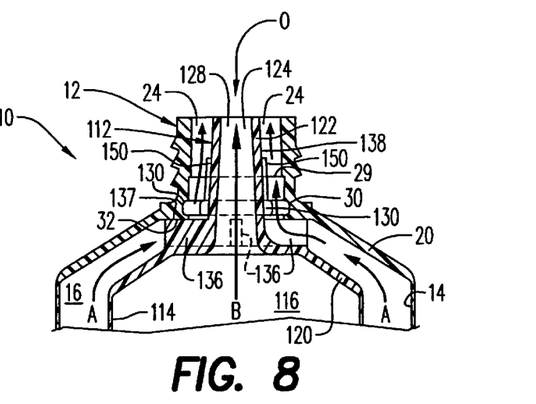
FIG. 8 is a vertical sectional view, with portions broken away, as would be seen along line 8-S of FIG. 2.
Figure 9:
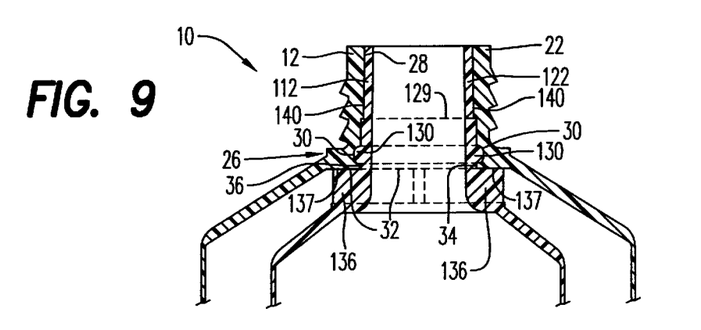
FIG. 9 is a vertical sectional view, with portions broken away, as would be seen along line 9—9 of FIG. 2.

FIGS. 8–10 show the manner in which inner tube neck 122 is locked within outer tube neck 22. FIG. 8, a sectional view of dual dispense tube 10 as would be seen along line 8—8 of FIG. 2, shows inner tube 112 locked within outer tube 12. More particularly, FIG. 8 is a vertical section through inner tube side walls 138 which shows, in front elevation, tube side wall surfaces 150, and the cut edges of bead 130 frictionally engaged within outer tube neck groove 30, and it shows portions of groove 30 which are not engaged with bead 130. FIG. 8 also shows upper surfaces 137 of inner tube ribs 136 in abutting engagement with a portion of outer tube neck base undersurface 32 which underlies groove 30.

FIG. 8 shows that when a dual dispense tube 10 is squeezed, product A, contained in first chamber 16 between outer tube side wall 14 and inner tube side wall 114, is moved upward between those side walls, between outer and inner tube shoulders 20, 120, to either side of and between and past ribs 136, between inner tube side walls 138 and the juxtaposed portions of outer tube neck bore 28, and out of a section or portion of outer tube orifice 24 of dual dispense tube orifice 0. Likewise, when dual dispense tube 10 is squeezed, product B, contained in second chamber 116 within inner tube side wall 114, is moved upward through bore 128 and directly out of inner tube orifice 124, which is the central rectangular portion or section of dual dispense tube orifice 0.

FIG. 9 is a sectional view of dual dispense tube 10 of FIG. 2, taken along line 9—9 through inner tube end walls 140, bead 130 and ribs 136. More particularly, FIG. 9 shows inner tube neck 122 disposed and locked within outer tube neck 22, wherein the outer surfaces of inner tube neck end walls 140, including radially outwardly extending step wall 129, are frictionally engaged with the juxtaposed portions of outer tube neck bore 28. Bead 130 of each opposed end wall 140 is frictionally engaged with groove 30 in outer tube neck base 26, and the portion of each end wall 140 directly below bead 130 is frictionally engaged with outer tube interstitial wall 34. "Frictionally engaged" here preferably means that there is from a zero about a 0.002 (0.051 mm) or 0.003 inch (0.076 mm) tolerance or gap between the outer surface of inner tube end walls 140, including bead 130, and the inner surfaces of outer tube bore 28, groove 30 and interstitial wall 34. FIG. 9 also shows that upper surfaces 137 of opposed inner tube ribs 136 abut a portion of outer tube neck base undersurface 32 which underlies bead 130 in groove 30 to thereby pinch and lock interstitial wall 34 firmly between rib upper surfaces 137 and bead 130. This abutment forces latch 36 against bead 130 and holds latch 36 firmly between rib surfaces 137 and bead 130 and firmly against bead 130. This causes latch 36 to latch, entrap and firmly lock bead 130 in groove 30. Thus, in the preferred embodiment of dual dispense tube 10, the securement means of outer tube 12, including groove 30, interstitial wall 34, latch 36 and undersurface 32, and the securement means of inner tube 112, including bead 130 and the locking means, comprised of ribs 136, cooperate to lock inner tube 112 axially and laterally within outer tube 12. It is to be understood that it is within the scope of this invention that inner tube neck 122 can be locked within outer tube neck 22 by the aforesaid abutment and latching mechanism, without frictional engagement of an outer tube interstitial wall 34 with a juxtaposed portion of inner tube end wall 140, and/or without pinching and locking of an interstitial wall.

FIG. 10 is an enlarged view with portions broken away of the encircled portion of FIG. 3. FIG. 10 shows that groove 30 extends in a direction radially outward from longitudinal axis LA of outer tube 12 (FIG. 3) and into the outer tube neck interior surface which forms bore 28. FIG. 10 shows that groove 30 has, and is defined in part by, a lower wall portion 31 which also forms the upper portion of latch 36. Latch 36 is here shown in the form of a lip, and is formed by a portion of outer tube neck base 26, lower wall portion 31, interstitial wall 34 and a portion of outer tube neck base undersurface 32. As shown, preferably, interstitial wall 34 forms part of bore 28 and is located between the lower edge defining groove 30 and the radially inward edge of undersurface 32. Preferably, the radially inward edge is chamfered.

As shown in FIG. 10, groove 30 has an axial height H, and interstitial wall 34 of latch 36 has an axial height h. It is understood that height h can equal or approximately equal height H. However, preferably, interstitial wall axial height h is less than groove axial height H, more preferably it is less than ½, and most preferably it is about ¼ to about ⅓ of groove axial height h. It has been found that when outer and inner tube necks 22, 122 are made of a polyethylene material such as a high density polyethylene, inner tube neck 122 can be locked firmly within outer tube neck 22 by employing an outer tube groove 30 having an axial height H of about 0.064 inch (1.626 mm) and an outer tube interstitial wall 34 whose axial height h is about 0.019 inch (0.483 mm). These heights, particularly axial height h, can vary depending on the polymeric materials employed and their physical characteristics, particularly their flexibility. Thus, for some outer tube neck materials which are quite flexible, relatively deformable and elastically recoverable, axial height h could equal or possibly even exceed axial height H. For outer tube neck materials which are more rigid and less deformable and elastically recoverable, the axial height h may be less than ¼ of groove axial H.

FIG. 10 shows that groove 30 preferably is formed in part by two curved surfaces, an upper curved surface formed by a radius R, and a lower curved surface formed by a radius r. Preferably, radius r is shorter than radius R. It will be understood that the outer surface of convexly shaped bead 130 is formed with basically the same radii as employed for groove 30. The greater radius B of the upper curved surface of bead 130 allows bead 130 to slip easily past interstitial wall 34 if these surfaces come into contact during assembly of dual dispense tube 10, when inner tube neck 122 is pushed up into outer tube neck 12. The dimensions of the inner tube neck and outer tube neck are adapted such that when bead 130 is seated within groove 30, ribs 136 abut a portion of outer tube neck undersurface 32. Inner tube 112 is thereby prevented from being inserted further into outer tube 12, without need of any aforementioned problematical prior art radially inwardly directed flange at the orifice of outer tube orifice 24. The shorter radius r forming the lower arcuate surface of bead 130 and of groove lower wall portion 31, and the short horizontal straight portion of bead 130 which runs to inner tube end wall 140 below the bead, and of lower wall 31 which runs to the edge of groove 30 and bore 28, as well as the immobility of latch 36 which is abuttingly pinched and locked by ribs 136 against bead 130, cooperate to prevent bead 130 from being dislodged axially downward from groove 30 when an axially downward force is exerted on the rim of the inner tube neck 122. It has been found that preferred dimensions for groove 30 include an upper curved surface radius B of about 0.040 inch (1.016 mm), a lower curved surface radius r of about 0.015 inch (0.381 mm), a groove radial depth and consequently a latch radial length L of about 0.018 inch (0.457 mm). As previously stated, the interstitial wall axial height h is about 0.019 inch (0.483 mm). The chamfered edge adjoining undersurface 32 and interstitial wall 34 can be formed by a radius of about 0.005 inch (0.127 mm). Preferably, the physical and other characteristics and dimensions of base 26 and/or of latch 36 are chosen and/or adapted to enable latch 36 to flex and deflect downward and radially outward when outer tube neck 22 is disassociated from the injection mold tooling on which the neck is formed, and to be forced radially inward and upward by locking means to latch, entrap and lock bead 130 in groove 30. Although some flexibility and deflection of latch 36 can be obtained by design of some flexibility in or some flexing of inner tube neck base connecting wall 33, most of the flexing or deflection is of latch 36 itself.

Figure 11:
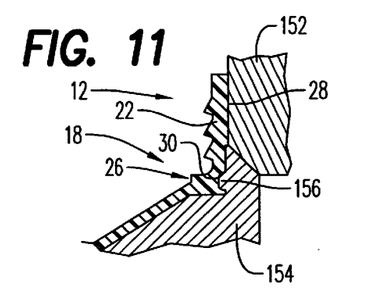
FIG. 11 is a vertical sectional view, with portions broken away, of a portion of the outer tube positioned on injection mold tooling.
Figure 12:
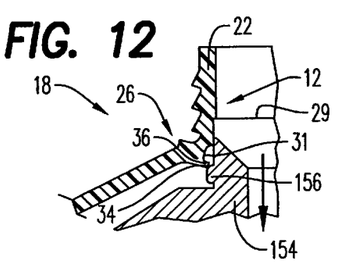
FIG. 12 is a vertical sectional view, with portions broken away, of the lower injection mold tooling being withdrawn from the outer tube of FIG. 11.

FIGS. 11 and 12 show apparatus for forming head 18 of outer tube 12. More particularly, FIG. 11 shows head 18 of outer tube 12 formed on male injection molding tooling comprised of an upper tool 152, and a lower tool 154 having an outwardly extending bead 156 forming groove 30 in bore 28 of outer tube neck 22.

As shown in FIG. 12, once outer tube head 18 is formed, the head and tooling are separated from one another. For example, head 18 can be held stationary while upper tool 152 (FIG. 11) is withdrawn axially upward (not shown) and lower tool 154 is withdrawn axially downward from outer tube neck 22. As lower tool 154 is being withdrawn, bead 156 of lower tool 154 engages groove lower wall 31 and causes latch 36 to deflect and pivot radially outward and downward. Outer tube neck base 26 may also be deflected outward. Because of the ability of latch 36 to deflect and open outward in this manner, there is no or no significant shearing of latch 36 or of interstitial wall 34, although the polymeric material of latch 36 may undergo some, but not significant, permanent deformation. It is understood that head 18 of outer tube 12, and head 118 of inner tube 122 can be formed by any suitable method, for example by injection or compression molding, and that each head can be assembled or secured to a tubular body wall by any suitable method, for example, with heat by induction to weld the head to the body wall.

Figure 13:
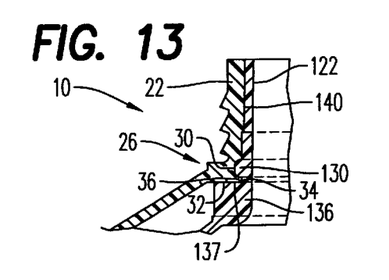
FIG. 13 is a vertical sectional view, with portions broken away, of the inner tube inserted into and locked within the outer tube of FIG. 12.

As shown in FIG. 13, even if there is some permanent deformation of latch 36, during assembly of dual dispense tube 10, when inner tube neck 122 is inserted and pushed upward into outer tube neck 22 inner tube bead 130 moves past latch 36 typically with slight (or possibly no) contact or interference. As bead 130 is seated within groove 30, ribs 136 abut undersurface 32 and push latch 36 radially inward and upward basically back into its as-formed position. When bead 130 is fully seated in groove 30, ribs 136 firmly hold latch 36 against bead 130 in groove 30 to thereby firmly latch and lock inner tube neck 122 within outer tube neck 22. Axial downward movement of inner tube 112 relative to outer tube 12 is prevented by the frictional engagement and entrapment of bead 130 in groove 30, particularly at groove lower wall 31 which wall is immobilized by latch 36 being pinched, held and locked primarily between bead 130 and ribs 136, and preferably also by interstitial wall 34 being frictionally engaged with the juxtaposed portion of end wall 140. Lateral movement of inner tube 112 within outer tube 12 is prevented by one or more of a number of features, including mainly that upper surfaces 137 of inner tube ribs 136 directly abut against outer tube neck base undersurface 32. Also, the surface portions of ribs 136 and of undersurface 32 which abut each other, preferably are in the same or corresponding planes, which planes preferably are parallel and at an angle which is equal to or less than 90° relative to the longitudinal central axis LA of outer tube neck 22. The planes can be at an angle greater than 90°. Further, the abutting surfaces portions of ribs 136 and of undersurface 32 abut along a length or extent sufficient to provide lateral stability of inner tube 112 within outer tube 12. Still further, the plurality of at least three, preferably four, ribs 136 are spaced from each other about inner tube neck 122 a sufficient, preferably equal, distance to prevent inner tube 112 from rocking or moving laterally within outer tube neck 22. Yet further, the lower portions of inner tube end walls 140 are broader than their upper portions, and the lower portions of end walls 140 and bead 130 extend through an arc which is greater than 180° about inner tube neck 122.

Figure 14:
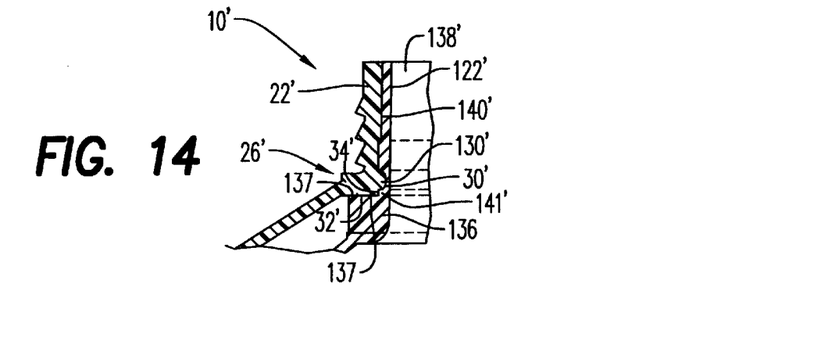
FIG. 14 is a vertical sectional view, with portions broken away, of an alternative embodiment of a dual dispense tube of the invention.

FIG. 14 shows an alternative embodiment of the dual dispense container of this invention. More particularly, FIG. 14 shows a dual dispense tube 10' whose outer tube neck 22', has means in the form of a radially inwardly extending bead 130', an undersurface 32' and an interstitial wall 34' between bead 130' and undersurface 32'. Inner tube neck 122' has securement means in the form of a radially inwardly extending groove 30' in the exterior surface of inner tube end wall 140', ribs 136 having an upper surface 137, and a radially outwardly extending step 141' between groove 30' and undersurface 32'.

Figure 15:
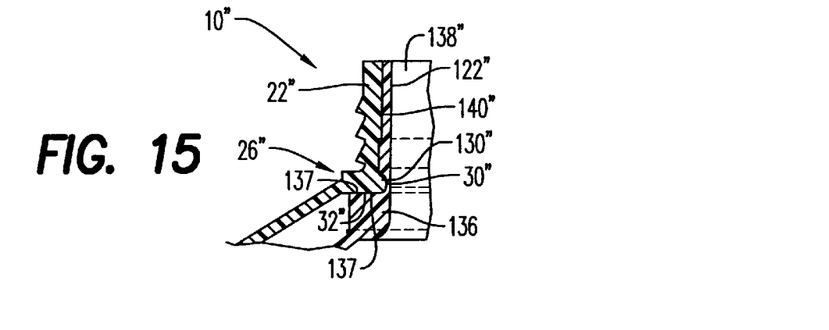
FIG. 15 is a vertical sectional view, with portions broken away, of another embodiment of a dual dispense tube of the invention.

FIG. 15 shows an alternative embodiment of the dual dispense container of this invention. More particularly, FIG. 15 shows a dual dispense tube 10" whose outer tube neck 22" has at its base 26", securement means in the form of a radially inwardly extending bead 130", and an undersurface 32". Inner tube neck 122" has securement means in the form of a radially inwardly extending groove 30" in the exterior surface of inner tube end wall 140', and ribs 136 having an upper surface 137. FIG. 15 shows that it is within the scope of this invention that an inner tube neck can be locked within an outer tube neck without a latching mechanism or an interstitial wall.

In the embodiments shown in FIGS. 14 and 15, downward axial movement of respective inner tube necks 122', 122" within respective outer tube necks 22', 22" is prevented by frictional engagement of beads 130', 130" with grooves 30', 30" at outer tube neck bases 26', 26". More particularly, upon exertion of an axially downward force upon the rim of inner tube 112, the additional material at base 26', 26" rigidities and stabilizes the neck base to resist radially outward movement of the base. Also, the radial extent of ribs 136, and the diametrical alignment of parallel side walls 138', 138", and the wider bottom portion of end walls 140', 140", rigidify and stabilize inner tube necks 122', 122" against radially inward movement.

Figure 16:
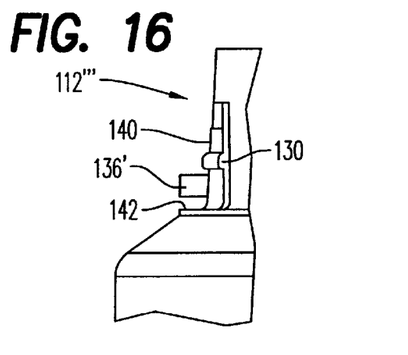
FIG. 16 is a side elevational view, with portions broken away, showing an alternative embodiment of locking means of the inner tube of the dual dispense tube of the invention.

FIG. 16 shows an inner tube 112'" having the same elements as inner tube 112 except that, here, the locking means are in the form of a plurality of members, e.g. arms 136' or pins which are integral with and extend radially outward from end walls 140. Arms 136' are not supported by or connected to inner tube land 142.

Figure 17:
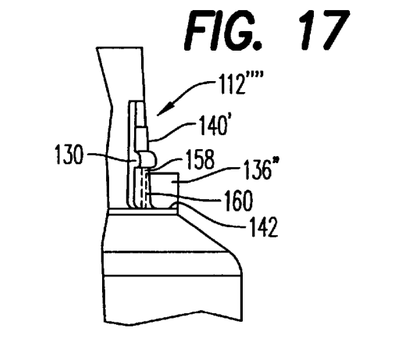
FIG. 17 is a side elevational view, with portions broken away, showing another embodiment of locking means of the inner tube of the dual dispense tube of the invention.

FIG. 17 shows an inner tube 112"" having the same elements as inner tube 112 except that, here, the locking means are in the form of pillars 136" which are integral with and supported by land 142, but are not connected to inner tube end wall 140'. Also, inner tube end wall 140' has indentations 158 therein (one shown by dashed lines) each of which is radially aligned with and in which resides the radially inner side edge 160 of rib 136".

Thus, FIGS. 1 through 17 show that improved securement of an inner container within an outer container can be obtained for a dual dispense container by providing the securement means at, including adjacent or proximate, the base of the outer tube neck, and preferably also at, including adjacent or proximate, the base of or a lower portion of the inner tube neck, which securement means at those locations, are relatively more stable than they would be at other locations of the tube necks. This structurally stabilizes the securement means during use of the assembled container, and thereby helps to lock i.e., prevent axial and preferably also lateral movement between the inner tube and the outer tube. Thus, main features of the invention for providing the lack of movement, stability and lock are the aforementioned locations of the securement means, and the abutment of the locking means, e.g. ribs, 136, of inner tube 112 directly against a portion of undersurface 32, 32', 32" of outer tube neck base 26, 26', 26".

The dual dispense tube of the invention is advantageous for several reasons. In the manufacture of outer tube 12, during axially downward removal of male injection mold tooling which has a bead to provide a groove 30 in base 26 of outer tube 12, latch 36 flexes radially outward and downward, and shoulder 20 may flex slightly outward. Thus, the male tool can be removed with little or no shearing of latch 36 or its interstitial wall 34. During axial movement of the outer tube relative to the male tooling, the short axial travel distance of beaded inner tube 112 along the tooling minimizes or eliminates shearing of bead 130. During assembly of dual dispense tube 10, because latch 36 is flexible and/or remains in a deflected open position, inner tube neck 122 with bead 130 can be moved past latch 36 and inserted into outer tube neck 22 typically with slight (or possibly with no) contact between bead 130 and latch 36 and thus with no shearing of bead 130. Shearing and extensive contact of bead 130 with the surface of bore 28 is avoided also because bead 130 need only travel a short axial distance into or near outer tube neck base 26 to reach and seat in groove 30. Avoidance of a long axial travel of bead 130 into upper portions of the outer tube neck also avoids possible outward distortion of outer tube neck 12, inward compression and distortion of inner tube neck 112, and the consequent possible problems of leakage and loose bead/groove engagement. Further, during assembly, the provision of abutment surfaces 137 of ribs 136 directly or nearly directly below bead 130 provides, preferably along extended surfaces, an immediate, full stop of axial travel of inner tube neck 122 up into outer tube neck 22. This avoids over-insertion of inner tube 112 into outer tube 12, and displacement of the bead from the groove during product filling of tube chambers 16, 116. It also avoids any outward deformation of outer tube shoulder 20 and damage to the interior surface of the shoulder which could otherwise occur during an elongated surface contact ride-up of the outer upper corners or edges of ribs from a mid-shoulder interior surface position against the shoulder during over-insertion or during product filling. In the preferred embodiment shown in FIGS. 1–14, land 142 is about 0.020 inch high (0.508 mm), and ribs 136 are about 0.125 inch (3.175 mm) high and about 0.040 inch (1.016 mm) wide. Thus, the axial height of the gap between rib upper surfaces 137 and the junction of side wall 140 with bead 130 is about 0.028 inch (0.711 mm).

Figure 18:
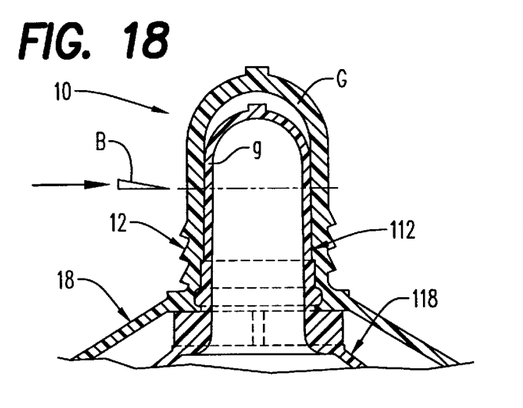
FIG. 18 is a vertical sectional view, with portions broken away, showing a method for removing the gates of assembled axially injection molded inner and outer tubes of the invention.

Assembled dual dispense containers employing the securement system of the invention and therefore having an inner tube locked axially and also laterally within an outer tube are advantageous because the tube necks can be provided with a dual dispense orifice in one plane and having a uniform rim seal surface. As shown in FIG. 18, because the inner and outer tubes 12, 112 are so securely locked, inner and outer tube heads 18, 118 can be made separately by an axial injection molding process, and the resulting inner and outer tubes 12, 112, each having a gate G, g, closing the orifice of its neck, can be assembled, secured together in accordance with the invention, and have their gates G, g simultaneously removed by a suitably operated cutting means, e.g., by blade B in one snipping, cutting, or trimming operation. As shown in FIG. 8, this provides an assembled dual dispense tube whose orifices, that is, whose rims or upper edges of outer and inner tube orifices 24, 124 are in the same plane, and thereby have a uniform seal surface. The orifices of the outer and inner tubes are surface. The orifices of the outer and inner tubes are considered to be in the same plane and provide a uniform seal surface if they are within a range of from about 0 to about 0.003 inch (0.076 mm). Simultaneously removing the gates of the assembled dual dispense tube minimizes variations in the axial lengths of the tube necks and thereby minimizes possibilities of leakage and premature mixing of contained products.

Without simultaneous trimming, the gates of axially injection molded heads would be individually removed. One method is to trim and remove gate G of outer tube neck, insert the untrimmed inner tube neck into the outer tube neck, using untrimmed gate of the inner tube to orient and facilitate placement of the inner tube neck within the outer tube neck, trim and remove inner tube gate g, and cap the outer tube neck.

With individual trimming and removing of the gates, there could be variations in the axial height of the inner and outer tube orifices of from more than about 0.003 inch (0.076 mm) to about 0.015 inch (0.381 mm) or more. Such variations could cause leakage and/or premature product mixing. There could also be leakage about the orifice lip of the outer tube neck of dual dispense tubes whose outer tube neck gate is trimmed with a conventional tool that leaves a carotte, or raised radially inward edge portion, about the lip of the outer tube neck. Conventional caps used to seal certain single dispense tubes, for example, for dispensing toothpaste products, have been found to not fully seal dual dispense tubes having such a carotte because such caps utilize a depending annular peripheral ring with a sharp angular bottom edge to cut into and seal the axially lower radially outer annular portion of the lip when the cap is threaded down onto the tube neck. Such caps do not fully seal against the carotte of the outer tube lip and they do not fully seal the inner tube orifice. However, it has been found that such dual dispense tubes with an outer tube lip carotte can be fully sealed if the cap includes an inner liner of a thickness and reliency sufficient to accept the overage in height of the carotte and yet fully seal against the inner and outer tube orifices. Employing such a cap is preferred and advantageous because it helps to prevent lateral movement or canting of the inner tube within the outer tube, especially if the fit of the inner tube neck within the outer tube neck and the bead/groove interlock are not sufficient to prevent canting.

An important feature of this invention is the flexibility or deflectability of latch 36. For a given material, this preferably is provided primarily by the design, and selection of the characteristics and dimensions of latch 36 itself, and secondarily, if at all, of adjacent portions of base portion 26 of outer tube neck 22. Thus, as shown, latch 36 preferably is primarily designed to flex, deflect, pivot or be displaced radially outward and downward from or about what can be considered a hinge point adjacent a curved portion of lower wall 31 of groove 30, and secondarily, to a lesser extent, if at all, from or about neck base connecting wall portion 33 (FIG. 10). In the embodiments shown, base wall connecting portion 33 is annular, is tapered radially inwardly and upwardly, and has concave outer and inner surfaces which form a thinned region therebetween which may provide an area for minor movement or displacement of outer tube neck base 26 and therefore of latch 36.

It is to be understood that latch 36 need not be an integral or singular member. For example, it can be split, for example by a horizontal radially outwardly extending cut or its function can be provided by separate cooperative members. Also, latch 36 need not be or have a surface which is contiguous with lower wall surface 31 of groove 30. Thus, there can be a member or portion of base 26 between the displaceable latch and groove 30 or bead 130, and there can be plural latches or members which cooperate with one another to achieve the desired latching function. Further, interstitial wall 34 need not be an annular or axial surface. It can have any suitable configuration, shape, or dimension. Also, interstitial wall 34 need not frictionally engage the juxtaposed portion of end wall 140 which is below bead 130, and it need not form part of or be aligned with slightly tapered (about 30) outer tube neck bore 28. Thus, latch 36 can be a radially short member such that it extends under only a portion of groove 30 or bead 130, so long as when abutted, it functions as a latch to hold and lock bead 130 in groove 30.

It is also to be understood that outer tube neck base undersurface 32 need not be part of latch 36. The portion of undersurface 32 which is abutted by ribs 136 can be a single surface in one plane, or several surfaces in several planes, and it or they can be of any suitable shape, dimension, or configuration, e.g. angled, undulating, stepped, etc. The same applies to the abutting upper surface(s) 137 of ribs 136, so long as the abutment of upper surface(s) 137 against undersurface(s) 32 cause(s) the latching and locking of bead 130 or of a similar functioning protruding member or members of inner tube neck 122. Although three or more preferably equally spaced ribs can be employed, four equally spaced ribs are preferred as they render latch 36 effective in preventing canting of inner tube 112 and in abutting and latching latch 36, while also providing a minimum of interference of only one thin rib in each product A flow passageway between bore 28 and inner tube side wall 138.

In the preferred embodiment of dual dispense tube 10, outer tube groove 30 preferably is annular and continuous about outer tube bore 28, as this permits the use of a discontinuous bead 130 or protrusion and obviates need for orientation between the bead or protrusion and groove. When, as shown in FIGS. 14 and 15, the bead or protrusion is provided at the base of the outer tube neck, and the groove is provided in the outer surface of the inner tube neck, it is preferred that each be discontinuous and oriented so to avoid interference with the wall surfaces which define the flow passageways for product A from chamber 16 to orifices 24. Although, the groove/bead or protrusion interlocking or similar functioning members can cover any suitable circumferential distance about the inner tube neck, preferably they cover a total of at least 180° thereabout, so as to provide stability to the securement and to prevent rocking of the inner tube neck within the outer tube neck. Although bead 130 and groove 30 can be annular and continuous, such is not preferred because it requires complicated designs and manufacturing equipment to create passageways for flow of product A contained in outer tube 12 radially inwardly or outwardly of the continuous annular bead and groove. The bead and groove can be of any suitable shape, size or configuration. For example, the bead can have a downwardly sloping upper wall, a vertical side wall and a horizontal bottom wall.

The dual dispense container of this invention can be made of any material(s) suitable for making such containers. Such materials are known to persons skilled in the art. The tubular bodies of the containers can be made of metal(s), plastic(s) or combinations of the same. The heads of the containers can be made of any suitable material, preferably one which will provide an operative, movable, preferably flexible latch according to the invention. Preferred materials include thermoplastics, such as ethylene polymers, including high and medium density polyethylenes, ethylene copolymers, propylene polymers, including polypropylene, propylene copolymers, and blends and ethylene and propylene polymers and copolymers.

The dual dispense container of this invention can be made by methods and tooling known to those skilled in the art. For example, with respect to the manufacture of a collapsible dual dispense tube, first a tubular body can be formed by extrusion of a single layer of plastic material for forming a single layer plastic tube, or by lamination or coextrusion of a multiple layer film which is formed into a tubular body. The tubular body can be placed on appropriate tooling and a head, for example, a pre-formed compression or injection molded head, can be joined to the tubular body. Alternatively, the tubular body can be placed in injection mold tooling wherein a tube head is axially injection molded and thermally joined at its shoulder to the tubular body. The procedures can be employed to separately form inner tube 12 and outer tube 112 of the invention. The tube heads are injection molded with tooling adapted to provide the securement means of the invention at the preferred locations as described above. With injection mold tooling which forms the groove in the outer tube neck base and which is withdrawn axially downward from the outer tube neck, the latch is moved or is pivoted radially outward to an open latch position. The dual dispense tube is assembled by inserting the inner tube neck within the outer tube neck with the bead of the inner tube neck passing axially by and without contacting or slightly contacting but not shearing the open latch of the outer tube neck. The inner tube neck is inserted into the outer tube neck until the bead is seated in the groove of the latter and the locking means of the former abut the undersurface of the outer tube neck base. This moves the latch radially upward and inward and latches and locks the bead of the inner tube within the groove of the outer tube. According to the method of the invention, because the inner and outer tubes are locked firmly together, the gates of the orifices of the heads of the assembled axially injection molded inner and outer tubes can be simultaneously cut or trimmed by suitable means and removed in one operation to provide resulting orifices of the inner and outer tubes in the same plane, and thereby provide the dual dispense tube with a uniform seal surface. The assembled tube is then capped using conventional capping methods. After the inner tube and outer tube are simultaneously or serially conventionally filled with product, the open bottom ends of the tubes are conventional sealed individually or together.

The securement system of this invention is not limited to being employed in connection with any particular design or configuration of multiple product or other dispensing orifice, or with any particular design or configuration of dual dispense container, meaning and including a multiple product, or multiple effect, dispensing container. The securement system can be employed to hold and lock an inner container, or any inner member, structure or insert at, adjacent or proximate, to or in the base of an outer container neck. Thus, the securement system can be employed in connection with a dual tube whose inner tube neck is short and does not extend fully to the orifice of the outer tube, such that the contained products are finally dispensed from only the orifice of the outer tube. The securement system also can be employed in connection with an outer tube that does not have an inner tube, but only has an insert attached at the base of the outer tube neck, for example, for segregating flow or providing a striping or other effect to one or more products, or for providing barrier properties to the outer tube head.

The preferred dual dispense tube 10 of this invention, configured as described herein and having a rectangular inner tube orifice 124 positioned or sandwiched between the opposed sections of outer tube orifice 24, is employed for packaging products which have dissimilar flow characteristics. More particularly, dual dispense tube 10 with its sandwich-type dual dispense orifice and passageways is designed to dispense a product A, contained in the outer tube and having, for example, a lower viscosity, through outer tube channels and orifices which present more surface resistance and impart a greater pressure drop, together with a product B, contained in the inner tube and having, for example, a higher viscosity, through bore 128 which presents relatively less flow resistance and pressure drop.

The present invention having thus been described with particular reference to the preferred embodiments and aspects thereof, it will be understood that various changes and modifications may be made therein without departing from the spirit and scope of the invention, as defined in the appended claims.

What is claimed is:

1. A dual dispense container, comprising:

an outer container and an inner container locked within the outer container, each container being comprised of a body wall defining a chamber, and a head comprised of a neck, and a shoulder communicating with the neck and body wall, the neck having a dispense orifice, a base, and a bore communicating with the orifice and the chamber, the neck of the outer container including securement means at the base of and communicating with the bore of the outer container neck, the base of the neck of the outer container having an undersurface, and the securement means of the outer container including the undersurface, the neck of the inner container being disposed within the neck of the outer container, the inner container having securement means engaged with the securement means of the outer container neck, the securement means of the inner container including locking means disposed about the inner container neck, and which abut the undersurface of the base of the outer tube neck, the securement means of the outer and inner container necks and the locking means of the inner container thereby cooperating to lock the inner container axially within the outer container.

2. The container of claim 1, wherein the abutment of the locking means against the undersurface of the base of the outer container neck enhances the engagement of the respective securement means of the inner and outer containers and thereby helps lock the inner container axially within the outer container.

3. The container of claim 1, wherein the base of the outer container neck includes an interstitial portion between the securement means of the outer container neck and the undersurface of the outer container neck, and the abutment of the locking means against the undersurface locks the interstitial portion between the securement means of the inner container and the locking means of the inner container.

4. A dual dispense container, comprising:

an outer container and an inner container locked within the outer container, each container being comprised of a body wall defining a chamber, and a head comprised of a neck, and a shoulder communicating with the neck and body wall, the neck having a dispense orifice, a base, and a bore communicating with the orifice and the chamber, the neck of the outer container having a groove at the base and extending from the bore into the interior surface of the neck, the base of the neck of the outer container having an undersurface, and a latch between the groove and the undersurface, the neck of the inner container being disposed within the neck of the outer container and having a wall with an outer surface, the outer surface having a bead extending outward therefrom, the bead fitting within and being frictionally engaged by the groove of the outer container neck, and the inner container having locking means disposed about the inner container neck, and which abut a portion of the undersurface of the base of the outer container neck, thereby causing the latch of the outer container neck to lock the bead of the inner container neck in the groove of the outer container neck and thereby lock the inner container axially within the outer container.

5. The container of claim 4, wherein the latch includes an interstitial wall which forms part of the bore of the inner container neck, and the abutment of the locking means against the undersurface of the inner container neck locks the interstitial wall between the bead of the inner container neck and the locking means of the inner container.

6. The container of claim 5, wherein the groove has an axial height, and the interstitial wall has an axial height which is less than the axial height of the groove.

7. The container of claim 6, wherein the interstitial wall has an axial height which is about one-quarter to one-half of the axial height of the groove.

8. The container of claim 4, wherein the groove is defined in part by a lower wall portion and the lower wall portion forms part of the latch.

9. The container of claim 4, wherein the portion of the undersurface of the base of the neck which is abutted by the locking means forms part of the latch.

10. The container of claim 4, wherein the groove has an axial height, and the latch has an axial height which is less than the axial height of the groove.

11. The container of claim 8, wherein the axial height of the latch is about one-quarter to one-half of the axial height of the groove.

12. The container of claim 4, wherein the outer container has a central longitudinal axis and the portion of the undersurface of the base of the outer container neck which is abutted by the locking means lies in a plane which is at an angle equal to or less than 90° relative to the longitudinal central axis of the outer container neck.

13. The container of claim 12, wherein the abutted portion of the undersurface of the base of the outer container neck extends under the bead in the groove and said abutted undersurface portion is at an angle of 90° relative to the longitudinal central axis of the outer container neck.

14. The container of claim 12, wherein the locking means have abutment surfaces for abutting the undersurface of the base of the outer container neck, and the disposition of said abutment surfaces and of said abutted undersurface correspond.

15. The container of claim 4, wherein the locking means comprise a plurality of upstanding rigid ribs sufficient in number and sufficiently spaced from one another to prevent the inner container from moving laterally within the outer container.

16. The container of claim 15, wherein the rigid ribs communicate with and extend from the inner tube neck and shoulder.

17. The container of claim 4, wherein the groove extends about the entirety of the bore of the outer tube neck, and the bead of the inner tube neck is interrupted and extends at least 180° about the inner tube neck.

18. The container of claim 4, wherein the latch is flexible.

19. The container of claim 4, wherein the outer container has a longitudinal central axis and the latch is movable radially outward and downward relative to the longitudinal central axis.

20. The container of claim 4, wherein the outer container has a longitudinal central axis and the base of the outer container neck is movable radially outward and downward relative to the longitudinal central axis.

21. A dual dispense container, comprising
an outer container and
an inner container locked within the outer container, each container being comprised of
a body wall defining a chamber, and
a head comprised of a neck, and a shoulder communicating with the neck and body wall, the neck having a dispense orifice, a base, and a bore communicating with the orifice and the chamber,
the neck of the outer container having an interior surface defining the bore, and having a bead at the base and extending from the interior surface into the area of the bore of the outer container neck,
the base of the neck of the outer container having an undersurface which extends in a direction away from the bore of the outer container neck,
the neck of the inner container being disposed within the neck of the outer container and having a wall with an outer surface, the outer surface having a groove extending thereinto, the bead of the outer container neck fitting within and being frictionally engaged by the groove of the inner container neck wall, and
the inner container having locking means disposed about the inner container neck, and which abut a portion of the undersurface of the base of the outer container neck, thereby locking the bead of the outer container neck in the groove of the inner container neck and locking the inner container axially within the outer container.

22. A collapsible dual dispense tube, comprising
an outer tube and
an inner tube locked within the outer tube, each tube being comprised of
a body having a collapsible wall defining a chamber, and
a head comprised of a neck, and a shoulder communicating with the neck and collapsible wall, the neck having a dispense orifice, a base, and a bore communicating with the orifice and the chamber,
the neck of the inner tube being disposed within the neck of the outer tube such that the dual dispense tube has a combined orifice comprised of three sections,
the neck of the outer tube having a cylindrical interior surface defining the bore, and having a groove at the base of the outer tube neck and extending from the bore into the interior surface of the outer tube neck,
the base of the neck of the outer tube having an undersurface, a portion of which communicates with the outer tube chamber, the base of the outer tube neck also having a latch between the groove and the undersurface,
the neck of the inner tube having a wall with an outer surface, the outer surface having a bead extending outward therefrom, the bead fitting within and being frictionally engaged by the groove of the outer container neck wall,
the neck of the inner tube having a rectangular shape and defining a rectangular bore and orifice, the neck of the inner tube being diametrically disposed within the cylindrical bore of the outer tube neck and forming a central rectangular section of the orifice of the dual dispense tube, the inner tube neck having opposed elongated side walls with opposed shorter end walls, each end wall having an arcuate outer surface which fits snugly within and against a portion of the interior surface of the outer tube neck wall, each side wall of the inner tube neck and the portion of the interior surface of the cylindrical bore of the outer tube neck juxtaposed to said respective side wall together forming a channel and orifice shaped as a segment of circle, the respective channels and orifices being disposed to each side of the inner tube neck and communicating with the chamber of the outer tube, the inner tube neck having locking means disposed thereabout, and which abut a portion of the undersurface of the base of the outer tube neck, thereby causing the latch of the neck of the outer container to lock the bead of the inner tube neck within the groove of the outer tube neck, and thereby lock the inner container axially within the outer container.

23. The tube of claim 22, wherein each end wall outer surface of the outer tube neck includes an extended axial edge portion and an extended portion of the bead, and the bead of the end walls extends a total of more than 180° about the interior surface of the cylindrical bore of the outer tube neck.

24. A method of locking an inner dispense tube within an outer dispense tube to form an assembled dual dispense tube, which comprises:

forming an inner tube having a head joined to a body, the head having a neck and a shoulder and the neck having an orifice, a lower portion, a base below the lower portion and adjoining the shoulder, a radially outwardly extending bead which extends a total of at least 180° about the lower portion, and a plurality of locking means disposed about the neck and axially spaced a short distance below the bead, forming an outer tube having a head joined to a body, the head having a neck with a bore, an orifice, a base, and a groove extending into the outer tube neck bore at the base of the outer tube neck and adapted to frictionally engage the bead at the inner tube neck, the base of the outer tube neck having an undersurface a portion of which extends under the groove and having an open latch between the groove and the undersurface, inserting the inner tube neck into the outer tube neck, and locking the former within the latter by frictionally engaging the bead of the inner tube neck within the groove of the outer tube neck, and abutting the locking means of the inner tube against the undersurface portion of the outer tube neck base, to thereby close the latch on the bead and latch and lock the bead of the inner tube within the groove of the outer tube.

25. The method of claim 24, wherein the steps of forming inner tube and of forming the outer tube are effected by separately axially injection molding the inner tube head and the outer tube head such that the orifice of each tube of the assembled dual dispense tube is closed by a gate, and the method includes the step of simultaneously trimming and removing the gates of the inner and outer tubes in one operation to thereby provide that the orifices of the inner and outer tubes are in the same plane.

26. The method of claim 24, wherein the steps of forming inner tube and of forming the outer tube are effected by separately axially injection molding the inner tube head and the outer tube head such that the orifice of each tube of the assembled dual dispense tube is closed by a gate, and the method includes the step of trimming and removing the gate of the outer tube, the inserting step includes using the untrimmed gate of the inner tube neck for orienting and facilitating the insertion of the inner tube neck into the outer tube neck, and after the locking step, trimming the gate from the inner tube neck.

27. A method of forming a dual dispense tube having an inner tube neck secured within an outer tube neck, such that the respective orifices of the inner and outer tube necks which comprise the orifice of the dual dispense tube are in the same plane, the method comprising:

separately axially injection molding the head of the inner tube and the head of the outer tube such that the neck of each head has an integral gate closing its intended orifice, joining a tubular body to the injection molded head of the inner tube and joining a tubular body to the injection molded head of the outer tube to provide an inner tube and an outer tube each having a gated neck and a tubular body, forming a dual dispense tube by inserting the neck of the inner tube within the neck of the outer tube, and axially and laterally locking the inner tube neck within the outer tube neck, and in one operation, simultaneously trimming and removing the gates of the inner and outer tubes of the dual dispense tube to provide that the orifices of the necks of the inner and outer tubes which comprise the orifice of the dual dispense tube are in the same plane.

* * * * *